United States Patent [19]

Tanibata

[11] Patent Number: 5,430,523
[45] Date of Patent: Jul. 4, 1995

[54] IMAGE PRINTER

[75] Inventor: Tohru Tanibata, Wakayama, Japan

[73] Assignee: Noritsu Koki Co., Ltd., Wakayama, Japan

[21] Appl. No.: 208,769

[22] Filed: Mar. 9, 1994

[30] Foreign Application Priority Data

Mar. 12, 1993 [JP] Japan .................................. 5-051602
Mar. 12, 1993 [JP] Japan .................................. 5-051603

[51] Int. Cl.$^6$ ...................... G03B 27/32; G03B 27/52
[52] U.S. Cl. ........................................ 355/32; 355/27; 355/40; 355/71
[58] Field of Search ............... 355/32, 35, 40, 50, 355/89, 27, 71

[56] References Cited

U.S. PATENT DOCUMENTS

| | | | |
|---|---|---|---|
| 4,605,972 | 8/1986 | Hatanaka | 358/302 |
| 5,072,253 | 12/1991 | Patton | 355/40 |
| 5,121,159 | 6/1992 | Ujiie | 355/38 |
| 5,208,612 | 5/1993 | Obu et al. | 346/153.1 |
| 5,278,610 | 1/1994 | Ishiwatari et al. | 355/50 X |
| 5,337,119 | 8/1994 | Tanibata et al. | 355/40 |

FOREIGN PATENT DOCUMENTS 308967 3/1989 European Pat. Off. .

*Primary Examiner*—Richard A. Wintercorn
*Attorney, Agent, or Firm*—Townsend & Townsend Khourie & Crew

[57] ABSTRACT

An image printer includes a projection-exposure section for projecting an image born on a film onto a photosensitive material, an image-exposure section for exposing the photosensitive material based on image information comprised of a plurality of image areas each including color data relating to a plurality of colors, and a transport device for transporting the photosensitive material through the projection-exposure section and the image-exposure section. The image-exposure section includes an exposure device for dividing the image information into a plurality of lines and exposing the photosensitive material with switching exposing colors corresponding to the plurality of color data by switching over a plurality of color filters, and a moving device for moving the exposure device and the photosensitive material relative to each other in a direction perpendicular to the lines. The image-exposure section further includes an exposure control unit for controlling operations of the exposure device and the moving device. The control unit effects a moving exposure control for exposing the photosensitive material by switching over the exposing colors while the photosensitive material and the exposure means are being moved relative to each other.

28 Claims, 8 Drawing Sheets

IMAGE PRINTER

BACKGROUND OF THE INVENTION

1. Field of the Invention

The present invention relates to an image printer, and more particularly to an image printer including a projection-exposure section for projecting an image born on a film onto a photosensitive material, an image exposure section for exposing the photosensitive material based on image information comprised of a plurality of image areas each including color data relating to a plurality of colors, and transport means for transporting the photosensitive material through the projection-exposure section and the image-exposure section.

2. Description of the Related Art

Such image printer as described above may be used for a variety of purposes. For instance, the printer allows the projection-exposure section and the image-exposure section to be utilized independently of each other. The printer is also usable for a multiple exposure operation. In this case, the projection-exposure section effects an exposure of the film image onto a certain portion of the photosensitive material and also the image-projection section effects a further overlapping exposure of another image onto the same portion of the photosensitive material while the photosensitive material is being transported by the transport means through the projection-exposure section and the image-exposure section.

Conventionally, the image-exposure section of the above-described image printer effects an exposure of a video image displayed on a CRT monitor onto the photosensitive material, the video image being comprised of a plurality of image areas each including color data relating to a plurality of colors.

According to the above conventional art, however, the image-exposure section including the CRT monitor tends to be large and complicated, such that it has been difficult to form the entire printer apparatus simple and compact. Thus, there remains room for improvement in this respect.

The present invention attends to the above-described state of the art. And, a primary object of the present invention is to provide an improved image printer which is compact and simple and which is superior in processing capacity through minimization of undesirable reduction in the speed of the image exposure operation.

SUMMARY OF THE INVENTION

For accomplishing the above-noted object, an image printer according to the present invention comprises:

a projection-exposure section for projecting an image born on a film onto a photosensitive material;

an image-exposure section for exposing the photosensitive material based on image information comprised of a plurality of image areas each including color data relating to a plurality of colors; and transport means for transporting the photosensitive material through the projection-exposure section and the image-exposure section;

wherein the image-exposure section includes;

exposure means for dividing the image information into a plurality of lines and exposing the photosensitive material with switching exposing colors corresponding to the plurality of color data by switching over a plurality of color filters;

moving means for moving said exposure means and said photosensitive material relative to each other in a direction perpendicular to said lines, and exposure control means for controlling operations of said exposure means and said moving means, said exposure control means being capable of effecting a moving exposure control for exposing the photosensitive material by switching over the exposing colors while the photosensitive material and the exposure means are being moved relative to each other.

According to the above-described construction, the transport means transports the photosensitive material while the photosensitive material is exposed at either of the projection-exposure section or the image-exposure section or at both of the same, depending on the necessity.

In the course of the above, the exposure operation at the image-exposure section is effected by the moving exposure control. That is, the image information divided into the plurality of lines is exposed on the photosensitive material, with switching over the exposing colors by switching over the plurality of color filters while the exposure means and the photosensitive material are being moved relative to each other by the moving means.

The image-exposure section adapted for processing the image information in the form of the plurality of the divided lines can be formed more compact and simple than the conventional construction using a CRT which processes the entire image information. Further, the moving exposure control can minimize the reduction in the exposure processing speed. Accordingly, the invention has fully achieved the primary object of providing an improved image printer which is compact and simple and which is superior in processing capacity through minimization of undesirable reduction in the speed of the image exposure operation.

According to one aspect of the present invention, the printer further comprises exposure mode instructing means for instructing the exposure control means to switch over between the moving exposure mode and a stationary exposure mode. With an instruction for the moving exposure mode, the exposure control means effects the above-described moving exposure control. Whereas, with an instruction for the stationary exposure mode, the exposure control means effects the stationary exposure mode in which the photosensitive material is exposed with switching over the exposing colors while the photosensitive material and the exposure means are maintained stationary relative to each other.

According to the above construction, at the image-exposure section, when the moving exposure mode is instructed from the exposure mode instructing means, the exposure of the photosensitive material is effected according to the moving exposure control scheme like the above-described first characterizing construction. On the other hand, when the stationary exposure mode is instructed from the exposure mode instructing means, the exposure is effected according to the stationary exposure control scheme in which the photosensitive material is exposed while the photosensitive material and the exposure means are maintained stationary relative to each other.

More particularly, in case reduction in the exposure processing time period is desired with maintaining the image quality at a certain sufficient level, the exposure is effected according to the moving exposure control. Whereas, in case the image quality has priority over the reduction in the exposure processing time period, the exposure is effected according to the stationary exposure control.

With the above-described feature, the exposure at the image-exposure section may be conveniently switched over between the moving exposure mode and the stationary exposure mode, depending on the necessity. Thus, the image printer with this additional feature provides the further advantage of convenience.

According to a further aspect of the present invention, drive means for effecting the switching over of the plurality of color filters is operable to effect the filter switching over operation repeatedly in accordance with an activation signal. And, the exposure control means controls the timings of the activations of the exposure means and the moving means based on information concerning the switching over of the color filters.

That is, the exposure control means adjusts the timing between the activation of the moving means and the activation of the exposure means.

According to the above construction, at the image-exposure section, the timing between the activations of the moving means and the exposure means is controlled based on the signal generated in association with a switching over of the color filters. Thus, the activation timing control is possible with such simple construction.

According to a still further aspect of the invention, the exposure control means is adapted to control the timing between the activations of the exposure means and the moving means, based on clock signals of a predetermined frequency.

That is, the timing control between the activations of the exposure means and the moving means is effected by the exposure control means based on the clock signals as the stable timing reference.

With the above feature, the timing control of the activations of the exposure means and the moving means may be effected with high precision.

According to a further aspect of the invention, the plurality of color filters are mounted on a rotary member rotatably driven by a drive means, with the color filters being arranged side by side along a periphery of the rotary member.

In the case of the above construction, the exposing colors are varied in association with rotation of the rotary member caused by the drive means.

Accordingly, the exposure means at the image-exposure section can vary the exposing colors for exposing the photosensitive material through the simple arrangement of the rotation of the rotary member carrying the plurality of color filters.

According to a still further aspect of the invention, the plurality of color filters are mounted on a filter mount slidably driven by a drive means, with the color filters being disposed side by side along a sliding direction of the filter mount.

With the above construction, as the filter mount is driven to slide by the drive means, the color filters juxtaposed along the sliding direction are moved to vary the exposing color to expose the photosensitive material.

The above construction is convenient in that the change of the exposing color for exposing the photosensitive material may be done by the simple arrangement of sliding the filter mount mounting the color filters.

According to a still further aspect of theinvention, the exposure means is adapted to switch over the exposing colors by selectively positioning the plurality of color filters disposed between a light source and an optical fiber for guiding light from the light source to the photosensitive material.

In the case of the above construction, the photosensitive material is exposed with the light guided by the optical fiber from the light source.

Then, this arrangement using the optical fiber for guiding the light from the light source in the exposure means of the image-exposure section provided a further advantage of allowing greater freedom in the disposing position of the light source resulting in greater freedom of the design of the entire printer apparatus.

It is further conceivable to dispose the light source outside a casing of the entire printer apparatus.

With the above, the light from the light source disposed outside the casing of the printer is guided along the optical fiber into the inside of the casing to expose the photosensitive material.

The arrangement of disposing the light source outside the casing of the printer body provides the further advantage of preventing the light sensitivity of the photosensitive material being disadvantageously affected by the heat generated from the light source, such that the image printer may operate in a stable manner.

According to a still further aspect of the invention, the image printer may be constructed as follows.

That is, the exposure control means at the image-exposure section controls the moving means and the exposure means in such a manner that a direction of the relative movement between the exposure means and the photosensitive material is reversed when an amount of the relative movement has exceeded a predetermined value corresponding to a predetermined number of the lines and that the exposing color is switched over with each reversal of the direction of the relative movement.

More particularly, in the exposure at the image-exposure section, according to the control scheme of the exposure control means, the reversal of the moving direction of the moving means is effected repeatedly each time when the amount of the relative movement between the exposure means and the photosensitive material has exceeded a predetermined value corresponding to a predetermined number of the lines.

The predetermined number of the lines may correspond to a number of lines constituting one frame of image information. Alternatively, the number may correspond to less than the one-frame image lines or to more than two-frame image lines.

As the moving means causes the relative movement between the exposure means and the photosensitive material, the exposure means switches over the color filters to change the exposing color with each reversal of the direction of the relative movement, so that the exposure is effected with one exposing color during one stroke of the relative movement, i.e. between the initiation of the relative movement in one direction until this direction is reversed.

In short, the exposure control means does not effect the switchover of the exposing color until the amount of the relative movement exceeds the predetermined value corresponding to the predetermined number of lines from the initiation of the relative movement in one direction to the reversal of the same, thereby to expose the photosensitive material with this single exposing color. Then, with the reversal of the direction of the relative movement, the photosensitive material is exposed with another exposing color.

The above-described construction achieves the further advantage of reducing the time period required for the exposure of the image information at the image-exposure section, since the exposure of the photosensitive material may be effected with a reduced number of exposing color switchover operations.

Thus, while avoiding size increase and construction complexity of the entire printer, the image printer having the above construction achieves maximization of the exposure processing speed at the image-exposure section, such that the exposure processing capacity of the entire printer may be improved.

According to a still further aspect of the present invention, the image printer may be constructed as follows.

That is, the exposure control means at the image-exposure section controls the moving means and the exposure means in such a manner that a direction of the relative movement between the exposure means and the photosensitive material is reversed when an amount of the relative movement has exceeded a predetermined value corresponding to a predetermined number of the lines and that the exposing color is switched over when the direction of the relative movement is reversed to a direction for the exposure so as to allow the exposure means to effect an exposure operation only in the direction for the exposure.

That is, as the moving means causes the exposure means and the photosensitive material to be moved relative to each other, the exposure means effects an exposure operation with a single exposing color during one stroke of the relative movement, i.e. between the initiation of the relative movement in one direction until this direction is reversed and the exposure means effects this exposure operation only in the direction for the exposure.

In other words, while the exposure means is exposing the photosensitive material with a certain exposing color, the exposure means and the photosensitive material are being moved relative to each other in the direction set for the exposure and then the direction of this relative movement is reversed when the amount of the relative movement has exceeded a predetermined value corresponding to a predetermined number of lines. In this case, however, the exposure means does not expose the photosensitive material when the relative movement takes place in the reverse direction. Thereafter, when the amount of this reverse relative movement has exceeded the predetermined value, the direction is again reversed to the original direction, so that the photosensitive material is again exposed in the course of the relative movement in this direction. And, when the direction is returned or reversed to the exposing direction, the exposure control means switches over the exposing color, so that the exposure means exposes the photosensitive material with this new exposing color. Thereafter, as this cycle is repeated, the photosensitive material is exposed with a plurality of exposing colors.

According to the above, the direction of the relative movement for exposing the photosensitive material is always the same. Then, this arrangement achieves the advantages of avoiding irregularities among the exposing positions of the different exposing colors due to e.g. a backlash of the moving means and of eliminating the necessity of changing the data sequence of the image information to be exposed, thereby to improve the exposure quality as well as to simplify the control construction.

Consequently, the image printer having the above-described construction provides the further advantages of the high quality exposure and the simple control construction at the image-exposure section, in addition to the advantages of the foregoing construction of the avoidance of the enlargement and complexity of the entire printer and of the maximized exposure processing speed at the image-exposure section.

According to a still further aspect of the present invention, the exposure control means controls the activation timing of the moving means in synchronism with the timing of the exposure activation of the exposure means.

With the above-described construction, the exposure control means activates the moving means in synchronism with activation of the exposure operation by the exposure means.

This construction provides the further advantage of allowing the activation timing between the exposure means and the moving means to be enabled by the simple construction.

Further and other objects, features and effects of the invention will become apparent from the following more detailed description of the embodiments of the invention with reference to the accompanying drawings.

DESCRIPTION OF THE PREFERRED EMBODIMENTS

Preferred embodiments of an image printer relating to the present invention will now be described in details with reference to the accompanying drawings.

Figure 1:
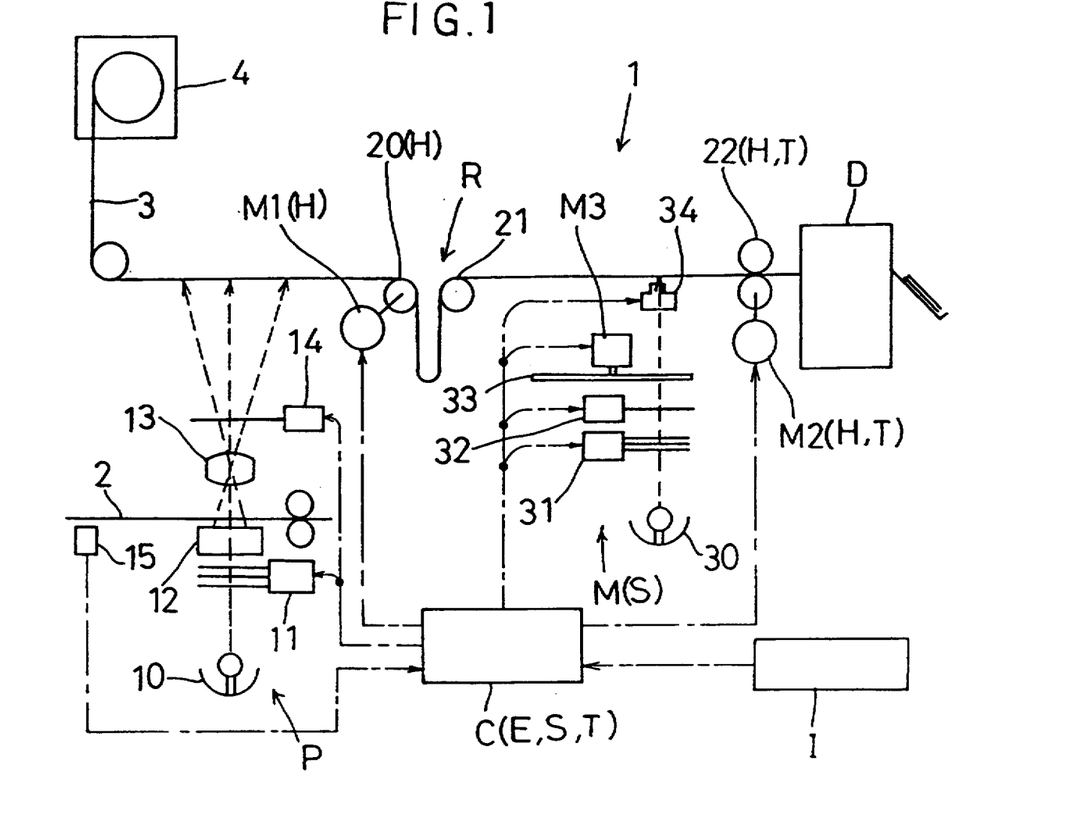
FIG. 1 is a schematic view showing a construction of an image printer according to one preferred embodiment of the present invention.

As shown in FIG. 1, an image printer 1 includes a projection-exposure section P for projecting/exposing image information of a film 2 onto a print paper 3 as a photosensitive material, a moving exposure section M as an exposure means for dividing image information into a plurality of lines and then exposing one line after another onto the print paper 3, a loop forming unit R for forming a loop of the print paper 3 in order to adjust a difference between a processing speed at the projection-exposure section P and a processing speed at the moving exposure section M, a developing section D for developing the printer paper 3 having been exposed at either one or both of the projection-exposure section P and the moving exposure section M, and a control unit C for controlling the above-described components of this image printer 1.

The print paper 3 withdrawn from a print-paper holder 4 in which the print paper 3 is accommodated in a rolled condition is exposed at either one or both of the projection-exposure section P and the moving exposure section M. Then, this print paper is developed at the developing section D and cut into a sheet including image information of one film frame amount.

Next, the respective components will be described.

The projection-exposure section P includes a projection-exposure light source 10, a light-modulating filter 11 for adjusting color balance of light to be irradiated onto a film 2, a mirror tunnel 12 for uniformly mixing light color components having passed through the light-modulating filter 11, a printing lens 13 for printing an image on the film onto the print paper 3, and a shutter 14, with all these components being aligned along a common optical axis. Further, at an upstream position on a transport path of the film 2, there is disposed an image sensor 15 for reading color density information of the image-bearing area of the film 2.

At the projection-exposure section P, the color density information of the image-bearing area of the film 2 is read by the image sensor 1.5. Then, based on this color density information, the control unit C controls the light-modulating filter 11 to adjust the irradiating light beam from the projection-exposure light source 10 to a color balance corresponding to the color density of the image on the film 2. And, with this adjusted light beam, the film 2 is irradiated thereby to expose the image on the film onto the print paper 3.

The loop forming unit R includes rollers 20, 21 for transporting the print paper 3 and a motor M1 for rotatably driving the roller 20. Further, between the roller 20 disposed on the upstream side in the print paper transport direction and the further roller 21 disposed on the downstream side in the print paper transport direction, though not shown, there is provided a flap switchable between a state for guiding the print paper 8 in a straight manner between the rollers 20, 21 and a further state for allowing the print paper 3 to be formed into a loop as shown in FIG. 1. In case of the double-exposure at both the projection-exposure section P and the moving exposure section M, such loop is formed of the print paper 3 in order to adjust a difference between processing speeds at the two exposure sections P, M.

The moving exposure section M includes a moving-exposure light source 30, a light-modulating filter 31 for adjusting color balance of the light components from the light source 30, a shutter 32, and a PLZT print head 34, with all these being disposed along a common optical axis. Further, between the shutter 32 and the PLZT print head 34, there is disposed a rotary filter assembly 33 mounting, as color filters, a red color filter 33a, a green color filter 33b and a blue color filter 33c juxtaposed to each other along the periphery of the assembly. This rotary filter assembly 33 is driven to rotate about a rotary shaft 33d by means of a motor M3 acting as a drive means incorporating a rotary encoder.

Though not shown, the PLZT print head 34 includes a great number of groups each consisting of a polarizer, an analyzer and PLZT interposed between the polarizer and the analyzer, with the groups being linearly aligned in a direction perpendicular to the transport direction of the print paper 3. Then, by varying an electric potential to be impressed between a pair of electrodes provided for each PLZT, a direction of polarization of the light beam component passing between the electrodes is varied so as to selectively allow or inhibit passage of the beam component through each PLZT. In this way, this printer head functions as a light beam shutter.

With the above-described construction, as the voltages to be impressed on the great number of PLZT are controlled independent of one another and also as a desired one of the respective color filters 33a, 33b, 33c is selectively brought into the optical path of the moving exposure section M, one line amount of the image information as color image information may be exposed onto the print paper 3.

On the downstream side of the print paper transport path at the moving exposure section M, there are provided a roller 22 for transporting the print paper 3 and a pulse motor M2 for driving the roller 22.

Though not shown, the developing section D includes a plurality of tanks containing developing liquid for developing the print paper 3 after the exposure, so that the print paper 3 is developed with its successive passage through the plurality of tanks.

The control unit C stores a program for controlling the respective components and image information e.g. read by an image reader or composed by a computer graphics and inputted to this unit.

According to the above-described construction of the image printer 1, the exposure of the print paper 3 at the moving exposure section M is effected as exposure of only one line amount of the image information divided into a plurality of areas. Therefore, for exposing the entire image information on the print paper 3, it is necessary to transport the print paper 3 in synchronism with the exposure at the moving exposure section M. Next, control operations effected by the control unit C for this purpose will be detailed with reference to a timing chart of FIG. 3.

Figure 2:
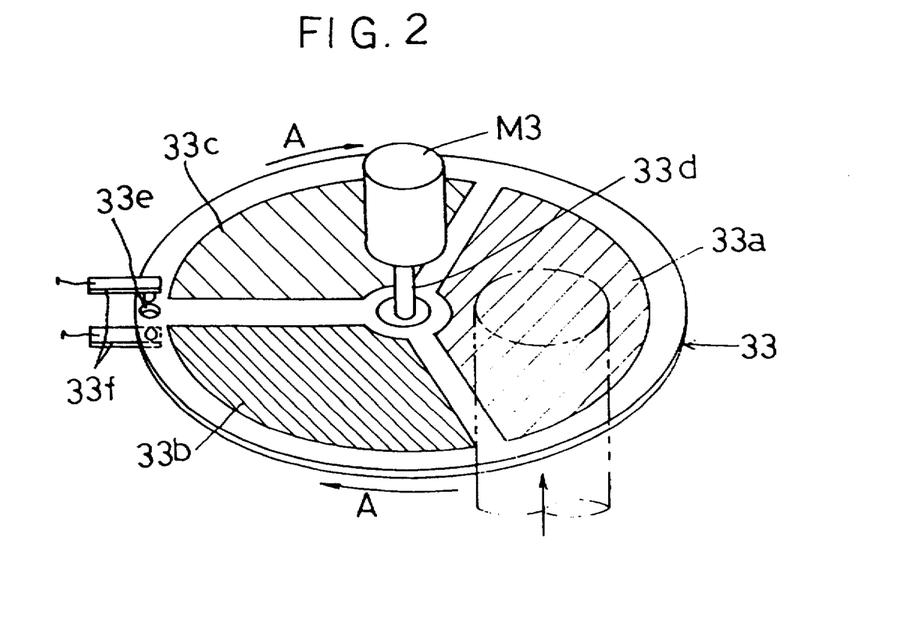
FIG. 2 is a view showing a construction of color filters to be used in the image printer of FIG. 1.
Figure 3:
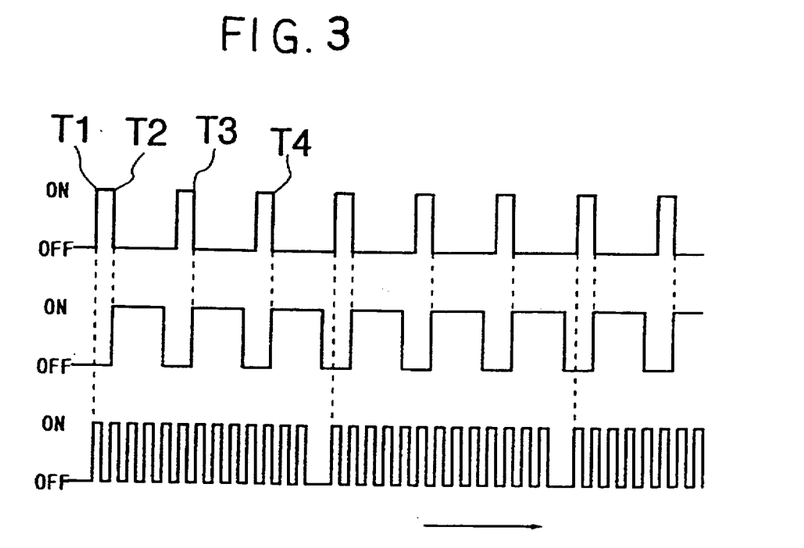
FIG. 3 is a timing chart relating to the embodiment of FIG. 1.

First, as shown in FIG. 2, a home position of the rotary filter assembly 33 is determined as a condition in which a home-position sensor 33f comprising a light sensor detects a hole 33e defined at one position in the outer periphery of the rotary filter assembly 33. At this home position, the roller 22 stops its transportation of the print paper 3. Then, from this condition of the home position denoted by a mark T1, the control unit C starts transmitting pulses to the pulse motor M2 for driving the roller 22 thereby to initiate the transportation of the print paper 3 and at the same time the control unit activates the motor M3 to rotate the rotary filter assembly 33 in a direction denoted by an arrow A in FIG. 2.

Thereafter, at a timing denoted by a mark T2 in FIG. 3 when a 120 degree rotation of the rotary filter assembly 33 is detected through an output signal from the rotary encoder incorporated within the motor M3, the control unit C stops the motor M3. Then, the shutter 32 of the moving exposure section M is turned 'ON', i.e. opened. Simultaneously with this opening of the shutter 32, based on one line amount of blue-color image information of the image information stored at the control unit C, the voltages to be impressed to the electrodes of the respective PLZT of the PLZT print head 34 are controlled to expose the print paper 3. With completion of this exposure, the shutter 32 is turned 'OFF', i.e. closed, according to an instruction from the control unit C.

Next, after lapse of a predetermined time period, the motor M3 is activated to rotate the rotary filter assembly 33 in the direction of the arrow A in FIG. 2. Then, at a timing denoted by a mark T3 in FIG. 3 when a 120 degree rotation of the rotary filter assembly 33 is detected through an output signal from the rotary encoder incorporated within the motor M3, the control unit C stops the motor M3. Then, the shutter 32 of the moving exposure section M is turned 'ON', i.e. opened. Simultaneously with this opening of the shutter 32, based on one line amount of green-color image information of the same line as the blue-color component exposed immediately before, the voltages to be impressed to the electrodes of the respective PLZT of the PLZT print head 34 are controlled to expose the print paper 3. With completion of this exposure, the shutter 32 is turned 'OFF', i.e. closed, according to an instruction from the control unit C.

Next, after lapse of a further predetermined time period, the motor M3 is activated to rotate the rotary filter assembly 33 in the direction of the arrow A in FIG. 2. Then, at a timing denoted by a mark T4 in FIG. 3 when the rotary filter assembly 33 has returned to its home position as the home-position sensor detects the hole 33e of the rotary filter assembly the control unit C stops the motor M3. Then, the shutter 32 of the moving exposure section M is turned 'ON', i.e. opened. Simultaneously with this opening of the shutter 32, based on one line amount of red-color image information of the same line as the green-color component exposed immediately before, the voltages to be impressed to the electrodes of the respective PLZT of the PLZT print head 34 are controlled to expose the print paper 3. With completion of this exposure, the shutter 32 is turned 'OFF', i.e. closed, according to an instruction from the control unit C.

With the above, the entire exposure of the respective color components included in the one line amount of the image information is completed.

At the timing T2, the control unit C starts the pulse transmission to the pulse motor M2 for driving the roller 22, and then after the print paper 3 has been transported by a predetermined amount with transmission of a predetermined number of pulses, the control unit stops the pulse transmission to suspend the transportation of the print paper 3. In the course of this, the amount of this transportation is set so that the print paper 3 is under the transported condition while the one line amount of the image information is being exposed on the print paper 3. That is, the control unit C effects a moving exposure control for exposing the print paper 3 in the course of the relative movement between the print paper 3 and the moving exposure section M.

Figure 4:
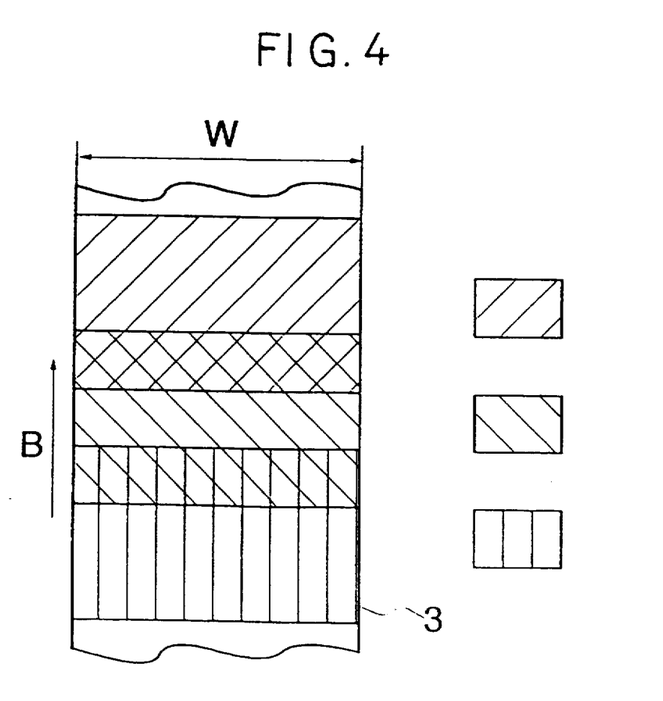
FIG. 4 shows an example of an exposed condition relating to the embodiment of FIG. 1.

For this reason, in FIG. 4 showing an area of the print paper 3 to be exposed by one element of PLZT, areas exposed with the respective blue, green and red components of the image information have a common width W which comprises the exposure width corresponding to the one element of PLZT and are slightly displaced from each other in the transport direction (denoted by an arrow B) of the print paper 3.

Accordingly, as the control unit, C repeats the exposure control for one line amount of the image information, the image information of the adjacent lines is exposed one after another, thereby to expose one frame amount of the image information.

Incidentally, this image printer 1 is designed to be switchable between a composite image mode in which the image on the paper exposed at the projection-exposure section P is double-exposed with a further image at the moving exposure section M and a further mode in which either one of the projection-exposure section P and the moving exposure section M is utilized alone. This mode switching operation is effected from an input device I connected to the control unit C.

Accordingly, the control unit C and the moving exposure section M together function as an image-exposure section S for exposing the print paper 3 based on image information comprised of a plurality of image areas each including color data relating to a plurality of colors. The rollers 20, 22, the motor M1 and the pulse motor M2 together function as transport means H for transporting the print paper 3 through the projection-exposure section P and the image-exposure section S.

The roller 22, the pulse motor M2 and the control unit C together function as moving means T for causing the moving exposure section M and the photosensitive material 3 to be moved relative to each other. Further, the control unit C functions as exposure control means E for controlling activation timings of the moving means T and the moving exposure section M.

Some other embodiments of the invention will be described next.

Figure 5:
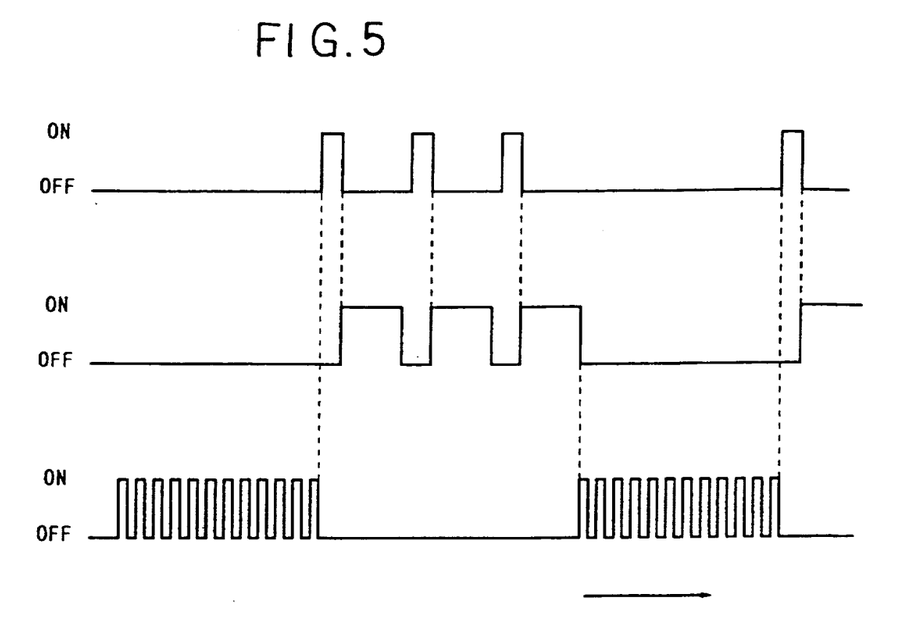
FIG. 5 is a timing chart relating to a further embodiment.

(1) In the foregoing embodiment, as the control of the activation timings of the moving exposure section M and the moving means T effected by the exposure control means E is effected as the moving exposure control for exposing the print paper 3 in the course of the relative movement between the print paper 3 and the moving exposure section M. Alternatively, as illustrated in FIG. 5, this control scheme may include also a stationary exposure control. In this case, no pulse signals are transmitted to the pulse motor and while the print paper 3 is maintained stationary, the shutter 32 is opened to expose the image information onto the print paper 3. And, the control unit C selectively provides the moving exposure mode for effecting the above-described moving exposure control or the stationary exposure mode for effecting the stationary exposure control. In this case, the input device I functions as an exposure mode instructing means.

Figure 6:
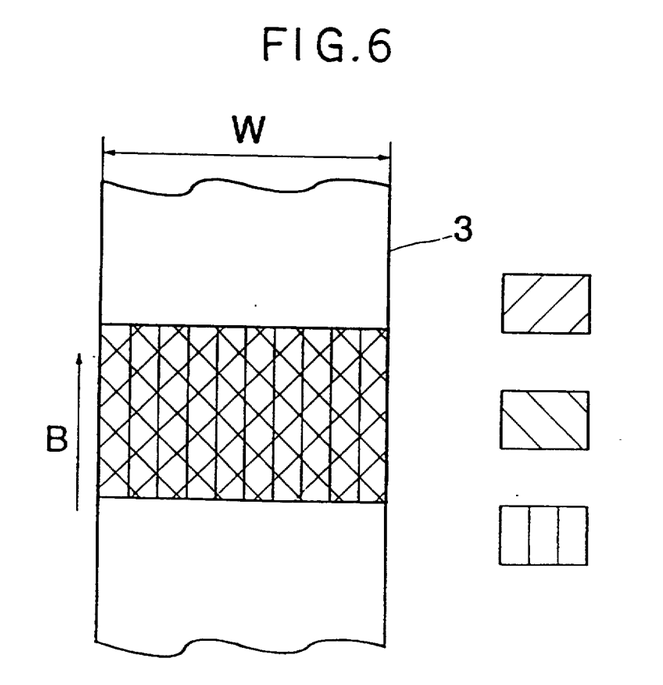
FIG. 6 shows an example of an exposed condition relating to the embodiment of FIG. 5.

Incidentally, in the stationary exposure control, as illustrated in FIG. 6, the positions exposed with the blue, green and red components of the image information are identical to each other.

Figure 7:
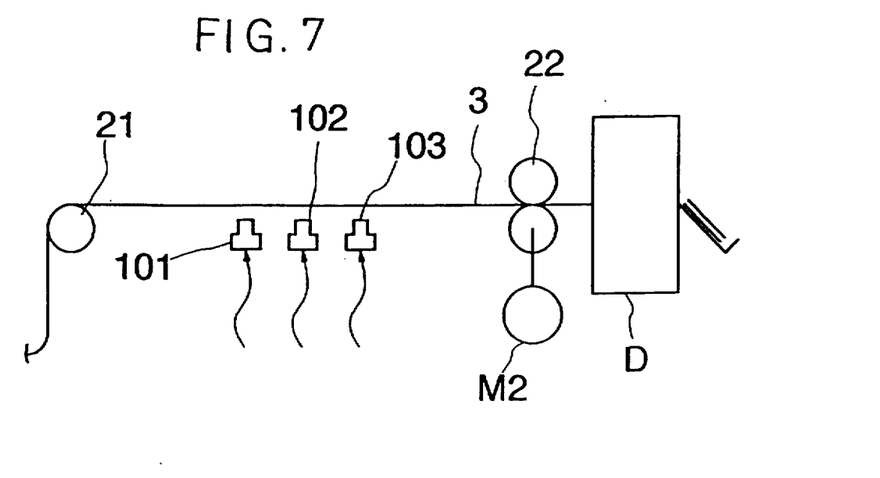
FIG. 7 is a partial schematic view of a construction relating to a still further embodiment.

(2) According to the foregoing embodiment, the image information of all the color components is exposed onto the print paper 3 by means of the single PLZT print head 34. Alternatively, as shown in FIG. 7, the image information of each color component may be independently exposed onto the print paper 3 by means of exposure units 101, 102, 103 comprised of PLZT print heads dedicated for the respective red, green and blue color components.

Figure 8:
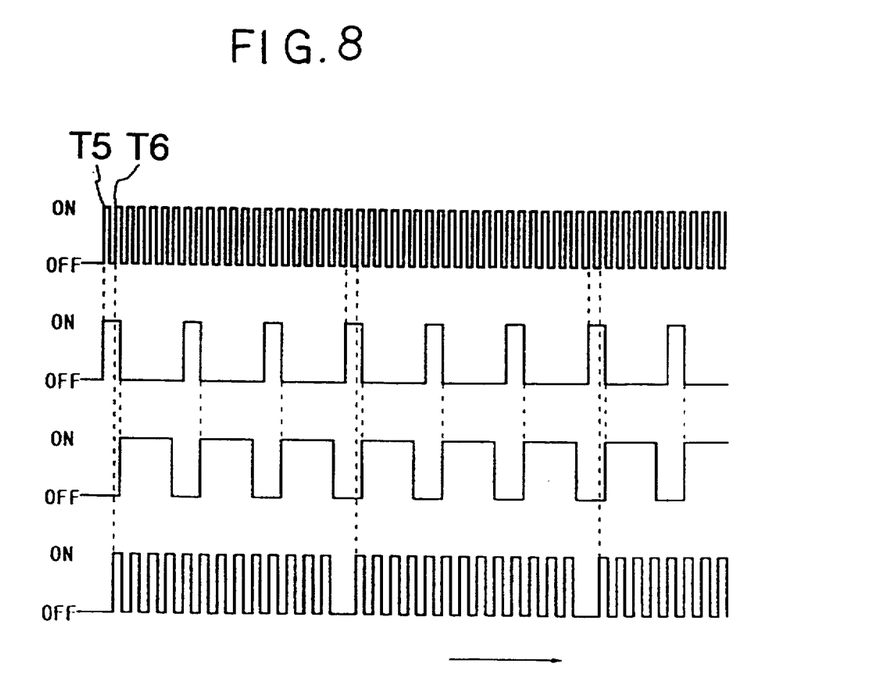
FIG. 8 is a timing chart relating to a still further embodiment.

(3) In the case of the foregoing embodiment, the activation timings between the moving exposure section M and the moving means T are effected based on the information relating to the position of the rotary filter assembly 83, i.e. to the information relating to the switching over of the red, green and blue color filters 38a, 33b, 33c. Instead, as illustrated in FIG. 8, it is conceivable to initiate the switchover of the rotary filter assembly 33 at a timing T5 and then to initiate the transport of the print paper 3 at a timing T6, based on clock signals. Then, these operations will be repeated for the image information of the respective color components.

Figure 9:
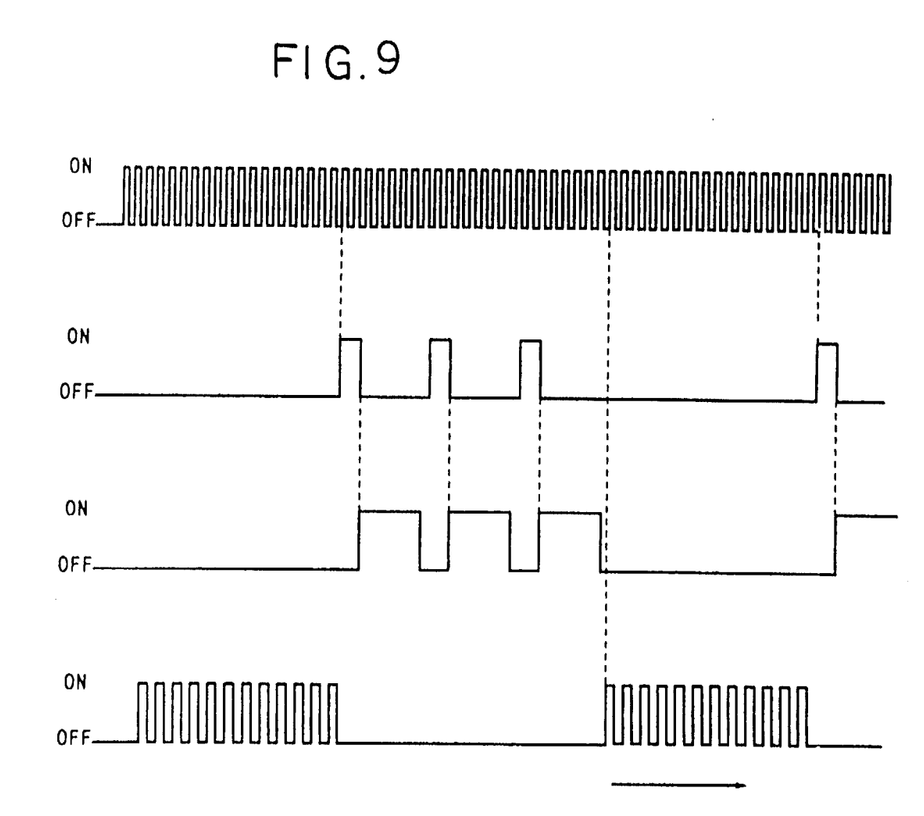
FIG. 9 is a timing chart relating to a still further embodiment.

Further, as illustrated in FIG. 9, the activation timings of the moving exposure section M and the moving means T may be controlled also based on clock signals in the case of the stationary exposure control for exposing the image information while the print paper 3 is maintained stationary with no transmission of the pulse signals to drive the pulse motor M2.

(4) According to the above-described construction of the image printer 1, the exposure of the print paper 3 at the moving exposure section M is effected for one line amount of the image information divided into a plurality of areas. Instead, for the exposure IS of the entire image information onto the print paper 3, while one of the exposing colors of the rotary color filter assembly 33 is fixedly maintained, the transportation and the exposure of the print paper 3 for each line is alternated repeatedly, thereby to effect exposure of the entire one-frame amount of the image information with the particular exposing color. Then, this operation is repeatedly effected for the image information of all the color components while changing the exposing color by rotating the rotary color filter assembly 33.

Next, the operations of the control unit C for controlling the above-described exposure process will be described with reference to a flow chart of FIG. 10.

As shown in FIG. 2, the home position is determined as the condition in which the home-position detecting sensor 33f comprising a light sensor detects the hole 33e defined at one position in the outer periphery of the rotary filter assembly 33. Under the condition of this home position, the transport of the print paper 3 by the roller 22 is stopped.

Figure 10:
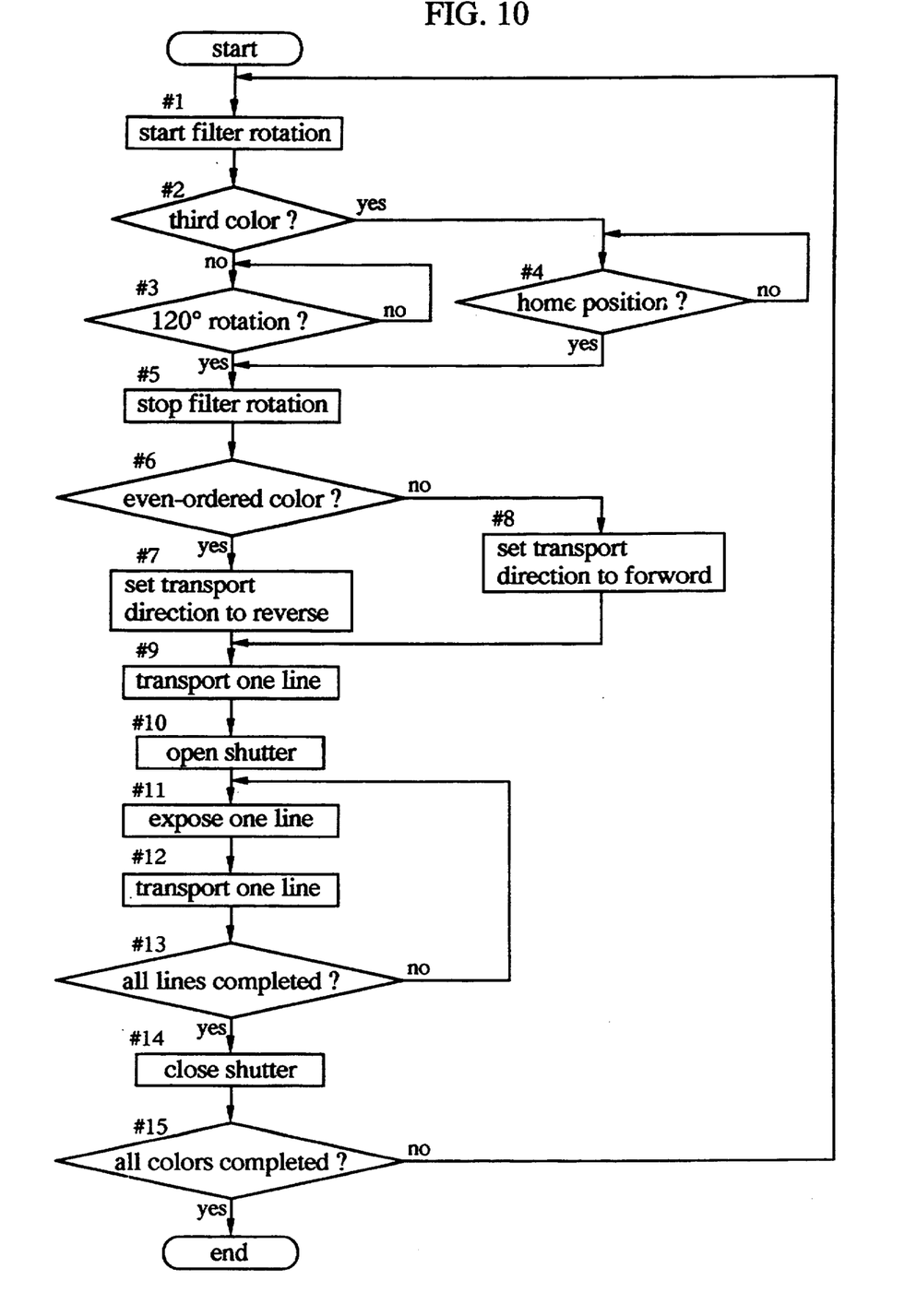
FIG. 10 is a flow chart relating to a still further embodiment.

Then, from the above-described condition, the operations in the flow chart of FIG. 10 are initiated.

First, from the home-position condition, the motor M3 for rotatably driving the rotary filter assembly 33 is activated to rotate the rotary filter assembly 33 in the direction of the arrow A in FIG. 2 (step #1). After the activation of the rotation, it is judged whether the exposing color to be exposed comprises the third exposing color or not, i.e. whether the exposing color comprises the last exposing color after completion of the exposures with two exposing colors (step #2). At this time, since the process is to start with the exposure of the image information of the first color component, i.e. the blue color component, the process goes to step #3.

At step #3, the process waits until the output from the rotary encoder of the motor M3 indicates that the motor M3 has rotated by 120 degrees. Then, the rotation of the motor M3 is stopped to stop the rotation of the rotary filter assembly 33 (step #5). Under this condition, the blue filter 33c is disposed on the optical path of the moving exposure section M.

Next, the direction of transporting the print paper 3, i.e. the rotation direction of the motor M2 for driving the roller 22 is determined.

First, it is judged whether the exposing color to be exposed comprises the color of the even or odd order in the ordering of the exposing colors (step #6). In case the exposing color comprises the blue color which is the color of the first order, at step #8, the rotation direction of the motor M2 is determined to be the forward direction, i.e. the original transporting direction of the print paper 3 from the holder 4 to the developing section D.

After one-line amount of transport (step #9), the shutter 32 is opened (step #10). Then, based on the image information of the blue color component of the first one line amount of the image information stored at the control unit C, the voltages to be impressed to the electrodes of the respective PLZT of the PLZT print head 34 are controlled to expose the print paper 3 (step #11). Upon completion of this exposure, the motor M2 is rotated in the previously determined direction to transport the print paper 3 by a distance corresponding to one-line amount of the image information (step #12).

The above-described steps #11, #12, #13 are repeatedly effected while shifting the image information to be exposed by one line amount, until it is judged that the exposure of all the lines of the one-frame amount of the image information has been completed.

If it is determined, at step #13, that the entire exposure of the blue color component of the image information has been completed, the shutter 32 is closed ( step #14). And, it is judged whether the exposure of all the color components has been completed or not (step #14).

At this point, since the exposure is completed with respect only to the blue component of the image information, the process returns to step #1 to activate the motor M3 for rotating the rotary filter assembly 33 in the direction of the arrow A in FIG. 2. At step #3, the process waits until the output from the rotary encoder of the motor M3 indicates that the motor M3 has rotated by 120 degrees. Then, the rotation of the motor M3 is stopped to stop the rotation of the rotary filter assembly 33 (step #5). Under this condition, the green filter 33b is disposed on the optical path of the moving exposure section M.

Next, the direction of transporting the print paper 3, i.e. the rotation direction of the motor M2 for driving the roller 22 is determined.

At this point, since the blue component of the image information which is the second exposing color is to be exposed next, with judgment at step #6, the process goes to step #7 at which the transport direction of the print paper 3 is determined to be the reverse direction. Then, the print paper is transported by one-line amount (step #9). Accordingly, this transportation of the print paper 3 comprises one-line amount of reversal of the print paper 3. And, in this state, the PLZT print head 34 is opposed to the position where the exposure of the last line has been effected with respect to the blue color component of the image information.

Thereafter., as is the case with the exposure of the blue color component of the image information described hereinbefore, the one-line amount of transportation and the one-line amount of exposure of the green color component of the image information are repeatedly carried out, until the exposure of the green component of the one-frame amount of the image information is completed and the shutter 32 is closed (step #14).

Then, with judgment at step #14, the process returns to step #1 to go onto exposure of the red color component of the image information which component comprises the third exposing color.

Like the above-described cases of the exposures of the blue and green color components, the rotation of the rotary color filter assembly 33 is initiated at step #1. In this case, however, since the red color comprises the third color component, at step #2, the process branches to step #4, so that, if it is judged that the home-position detecting sensor 33f of the rotary color filter assembly 33 has detected the hole 33e (step #4), the rotation of the rotary color filter assembly 33 is stopped.

Next, since the red color comprises the third exposing color, at step #6, the process branches to step #8, thereby to determine the transport direction of the print paper 3 to be the forward direction again (step #8).

Thereafter, the print paper 3 is transported by one line amount to set the exposure-starting line (step #9). Then, by opening the shutter 32, like the exposures of the blue and green color components, the one-line amount of transportation and the line-line amount of exposure of the green color component of the image information are repeatedly carried out to complete the exposure of the red color component of the one-frame amount of the image information, and then the shutter is closed (step #14).

With completion of the exposure of the red color component of the image information, it is determined that the exposure has been completed with respect to all the color components (step #15). This completes the exposure of the one-frame amount of the image information onto the print paper 3.

Incidentally, this image printer 1 is designed to be switchable between the composite image mode in which the image on the paper exposed at the projection-exposure section P is double-exposed with a further image at the moving exposure section M and a further mode in which either one of the projection-exposure section P and the moving exposure section M is utilized alone. This mode switching operation is effected from the input device I connected to the control unit C.

Accordingly, the roller 22, the pulse motor M2 and the control unit C together function as the moving means T for causing the moving exposure section M and the photosensitive material 3 to be moved relative to each other. Further, the control unit C functions as the exposure control means E for controlling activation timings of the moving means T and the moving exposure section M. And, the control unit C, the moving exposure section M, the moving means T, and the exposure control means E together function as the image-exposure section S for exposing the print paper 3 based on image information comprised of a plurality of image areas each including color data relating to a plurality of colors.

The rollers 20, 22, the motor M1 and the pulse motor M2 together function as the transport means H for transporting the print paper 3 through the projection-exposure section P and the image-exposure section S.

(5) In the foregoing embodiment, the print paper 3 is exposed both in the case where the print paper 3 is transported in the forward direction which comprises the original transportation direction of the print paper 3 from the print-paper holder 4 to the developing section D and in the further case where the print paper is transported in the reverse direction. Instead, as illustrated in the flow chart of FIG. 11, it is conceivable to adapt the exposure control means to effect the exposure of the print paper 3 only when the transportation direction of the print paper comprises the forward direction as the exposing direction and such that the exposing color is switched over with change of the transportation direction of the print paper 3 to the forward direction.

Figure 11:
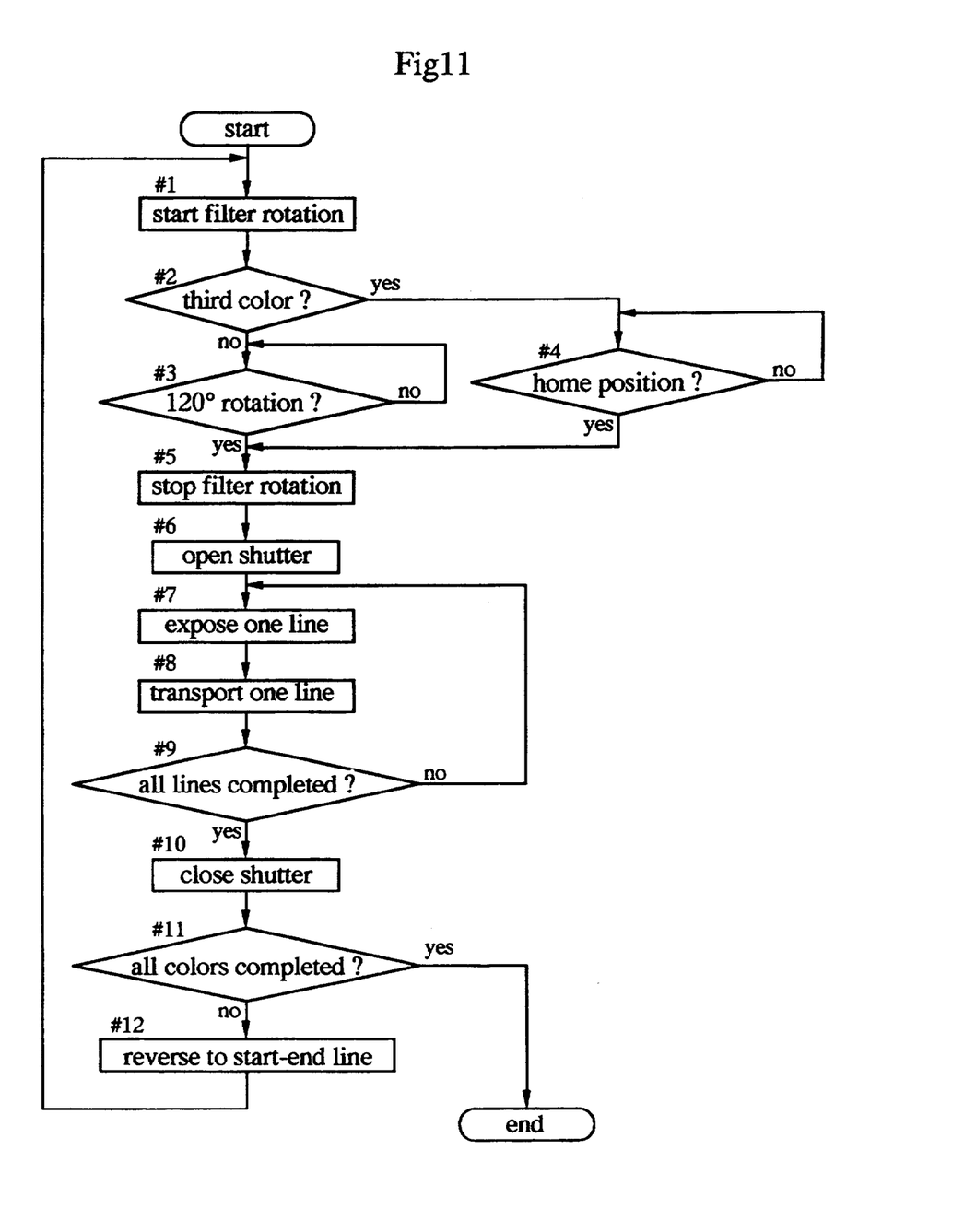
FIG. 11 is a flow chart relating to a still further embodiment.

In the flow chart of FIG. 11, when exposure of the print paper 3 with a certain exposing color is completed through the processes at steps #6 through #10, it is judged whether the exposures with all the exposing colors have been completed or not (step #11). If not, the print paper 3 is transported in the reverse direction to be returned to the starting end line of the exposure with the next exposing color (step #12). After the instruction for the transportation of the print paper 3 in the reverse direction, the rotary color filter assembly 33 is rotated to switch over the exposing colors (steps #1 through #5), thereby to repeatedly effect one-line amount of exposure and transportation, so that exposure of the one-frame amount of the image information with respect to this particular exposing color is completed.

As described above, with completion of the exposure of all the exposing color components of the image information, the exposure operation of the one-frame amount of the image information is completed.

(6) In the foregoing embodiment, the exposure is effected for one-frame amount of the image information, with setting of one exposing color. Alternatively, the exposure may be effected for more than two-frame amount of image information, with setting of one exposing color. Or, the exposure may be effected for a plurality of lines of image information less than one-frame amount. In these manners, the number of lines to be exposed with setting of one exposing color may be varied depending on the convenience.

(7) In the foregoing embodiments, as illustrated in the flow charts of FIGS. 10 and 11, the activation timing of the moving means T is controlled in synchronism with the activation timing of the exposure operation at the moving exposure section M. Instead, it is conceivable to activate both these moving exposure section M and the moving mean T based on clock signals of a predetermined frequency.

Figure 12:
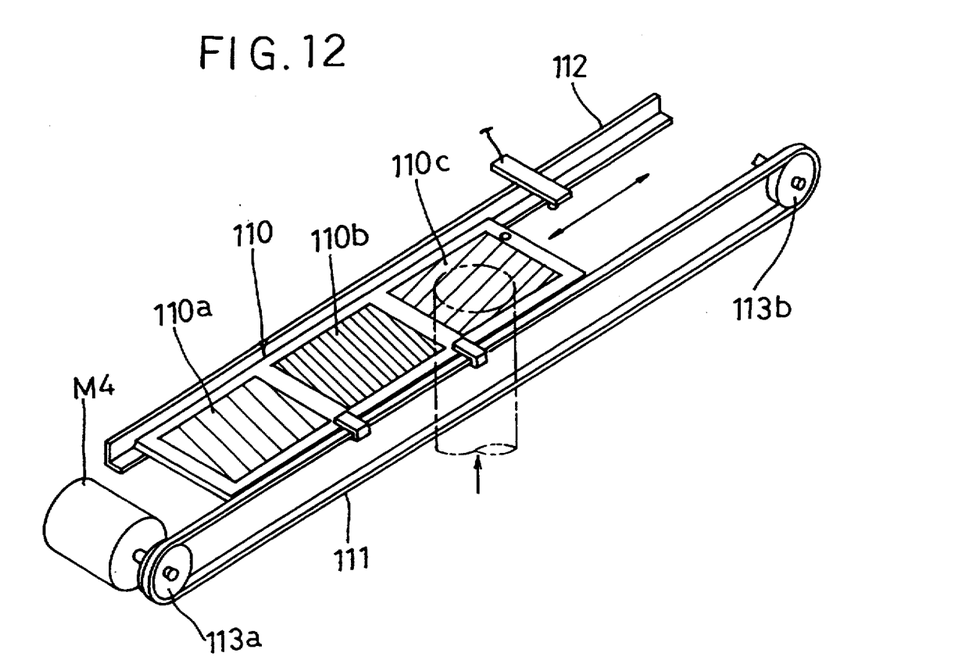
FIG. 12 shows a construction of color filters relating to a still further embodiment.

(8) In the foregoing embodiments, the red, green and blue color filters 33a, 33b, 33c are arranged radially with respect to the rotary shaft 33d of the rotary color filter assembly 33. A different arrangement is conceivable as shown in FIG. 12. In this, blue, green and red filters 110a, 110b, 110c are mounted linearly on a filter mount 110. One terminal end of this filter mount 110 is secured to a belt 111, while the other terminal end of the mount is adapted to be guided by a guide 112. The belt 111 is entrained about a pair of pulleys 113a, 113b. Then, by driving the belt 111 by means of a motor M4 as drive means, the filter mount 110 is slidably driven.

Figure 13:
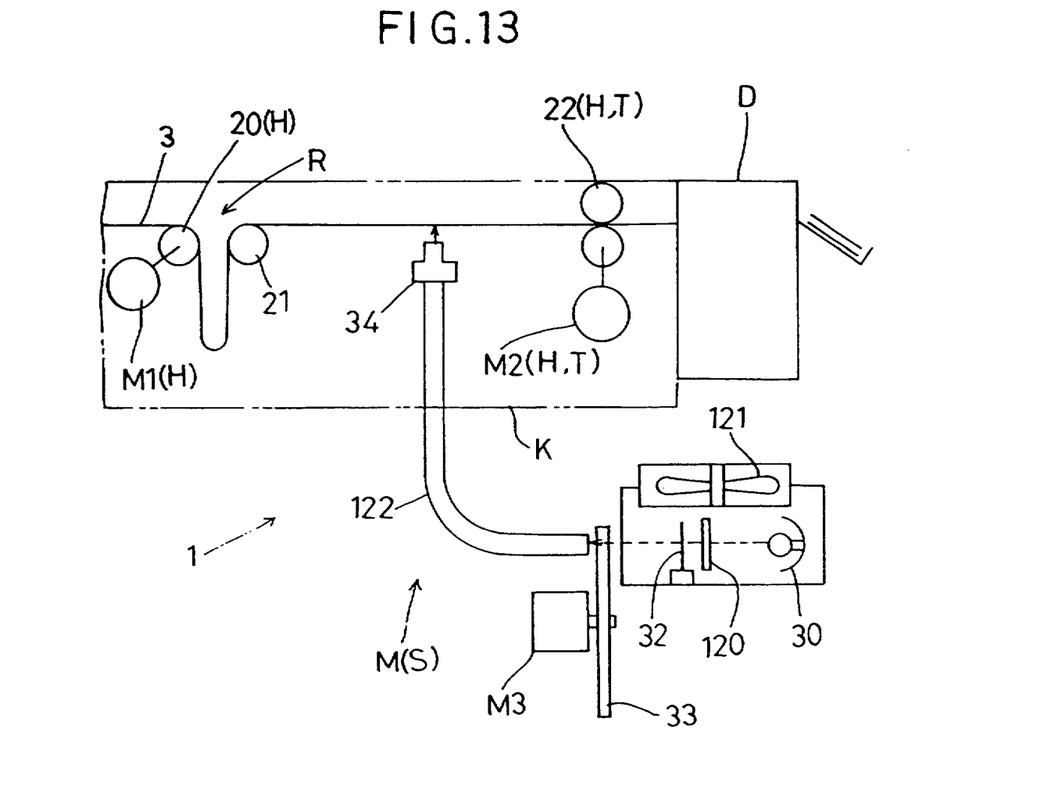
FIG. 13 is a partial construction view of a still further embodiment of the present invention.

(9) In the foregoing embodiments, the light beam from the light source 30 of the moving exposure section M is directly irradiated onto the PLZT print head 34. Instead, a further arrangement is conceivable as illustrated in FIG. 13. In this case, the light source 30 is accommodated inside a single housing together with an IR cut filter 120 for preventing passage of infrared beam, the shutter 32 and a fan motor 121 for cooling. Then, the beam component which has emitted from the light source 30 and passed through the IR cut filter 120, the shutter 32 and one of the color filters 33a, 33b, 33c of the rotary color filter assembly 33 is introduced into an optical fiber 122. Then, this light beam guided along the optical fiber 122 is irradiated on the PLZT print head 34 to be incident on the print paper 3.

Further, if the light beam from the light source 30 is guided by means of the optical fiber 122 as described above, the disposing position of the light source 30 may be freely set. So, as shown in FIG. 13, the light source may be disposed outside of a casing K of the image printer body 1.

(10) In the foregoing embodiments, the exposure of each line of the image information is effected by alternately repeating the one-line amount of exposure and one-line amount of transportation of the print paper 3. Instead, it is conceivable to expose each line of the image information in succession while the print paper 3 is being continuously transported at a predetermined speed.

(11) In the foregoing embodiments, the rotary color filter assembly 33 mounts the three color filters 33a, 33b, 33c of the red, green and blue colors. Instead, any one of these color filters may be eliminated. Or, a further color filter of any other color, e.g. an orange color filter may be employed additionally.

(12) In the foregoing embodiments, the print paper 3 is employed as the photosensitive material. Instead, a positive film or any other photosensitive material such as a photosensitive drum used in e.g. a photocopier apparatus may be employed.

(13) In the foregoing embodiments, the relative movement between the moving exposure section M and the print paper 3 is realized by moving the print paper 3 with maintaining the moving exposure section M stationary. Conversely, the relative movement between the moving exposure section M and the print paper 3 may be realized by sliding the moving exposure section M with maintaining the print paper 3 stationary.

(14) In the foregoing embodiments, the moving exposure section M employs the light shutter comprised of the PLZT. Instead, for instance, a light shutter comprised of a liquid crystal element may be employed as the print head.

The invention may be embodied in other specific forms without departing from the spirit or essential characteristics hereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printer comprising:
   a projection-exposure section for projecting an image born on a film onto a photosensitive material;
   an image-exposure section for exposing the photosensitive material based on image information comprised of a plurality of image areas each including color data relating to a plurality of colors; and
   transport means for transporting the photosensitive material through the projection-exposure section and the image-exposure section;
   wherein the image-exposure section includes;
      exposure means for dividing the image information into a plurality of lines and exposing the photosensitive material with switching exposing colors corresponding to the plurality of color data by switching over a plurality of color filters;
      moving means for moving said exposure means and said photosensitive material relative to each other in a direction perpendicular to said lines, and
      exposure control means for controlling operations of said exposure means and said moving means, said exposure control means being capable of effecting a moving exposure control for exposing the photosensitive material by switching over the exposing colors while the photosensitive material and the exposure means are being moved relative to each other.

2. An image printer as defined in claim 1, further comprising drive means for effecting the switching over of the plurality of color filters to effect the filter switching over operation repeatedly in accordance with an activation signal, wherein said exposure control means controls the timings of the activations of said exposure means and said moving means based on information concerning the switching over of the color filters.

3. An image printer as defined in claim 1, wherein said exposure control means controls the timing between the activations of said exposure means and said moving means, based on clock signals of a predetermined frequency.

4. An image printer as defined in claim 1, wherein said plurality of color filters are mounted on a rotary member rotatably driven by a drive means, with said color filters being arranged side by side along a periphery of said rotary member.

5. An image printer as defined in claim 1, wherein said plurality of color filters are mounted on a filter mount slidably driven by a drive means, with said color filters being disposed side by side along a sliding direction of said filter mount.

6. An image printer as defined in claim 1, wherein said exposure means is adapted to switch over the exposing colors by selectively positioning said plurality of color filters disposed between a light source and an optical fiber for guiding light from said light source to said photosensitive material.

7. An image printer as defined in claim 6, wherein said light source is disposed outside a casing of the body of the image printer.

8. An image printer as defined in claim 1, further comprising exposure mode instructing means for instructing said exposure control means to switch over between a moving exposure mode and a stationary exposure mode, wherein, with an instruction for the moving exposure mode, said exposure control means effects the moving exposure control, whereas, with an instruction for the stationary exposure mode, said exposure control means effects the stationary exposure mode in which the photosensitive material is exposed with switching over the exposing colors while the photosensitive material and the exposure means are maintained stationary relative to each other.

9. An image printer as defined in claim 8, further comprising drive means for effecting the switching over of the plurality of color filters to effect the filter switching over operation repeatedly in accordance with an activation signal, wherein said exposure control means controls the timings of the activations of said exposure means and said moving means based on information concerning the switching over of the color filters.

10. An image printer as defined in claim 8, wherein said exposure control means controls the timing between the activations of said exposure means and said moving means, based on clock signals of a predetermined frequency.

11. An image printer as defined in claim 8, wherein said plurality of color filters are mounted on a rotary member rotatably driven by a drive means, with said color filters being arranged side by side along a periphery of said rotary member.

12. An image printer as defined in claim 8, wherein said plurality of color filters are mounted on a filter mount slidably driven by a drive means, with said color filters being disposed side by side along a sliding direction of said filter mount.

13. An image printer as defined in claim 8, wherein said exposure means is adapted to switch over the exposing colors by selectively positioning said plurality of color filters disposed between a light source and an optical fiber for guiding light from said light source to said photosensitive material.

14. An image printer as defined in claim 13, wherein said light source is disposed outside a casing of the body of the image printer.

15. An image printer comprising:
a projection-exposure section for projecting an image born on a film onto a photosensitive material;
an image-exposure section for exposing the photosensitive material based on image information comprised of a plurality of image areas each including color data relating to a plurality of colors; and
transport means for transporting the photosensitive material through the projection-exposure section and the image-exposure section;
wherein the image-exposure section includes;
exposure means for dividing the image information into a plurality of lines and exposing the photosensitive material with switching exposing colors corresponding to the plurality of color data by switching over a plurality of color filters;
moving means for moving said exposure means and said photosensitive material relative to each other in a direction perpendicular to said lines, and
exposure control means for controlling said moving means and said exposure means in such a manner that a direction of the relative movement between said exposure means and said photosensitive material is reversed when an amount of said relative movement has exceeded a predetermined value corresponding to a predetermined number of said lines and that the exposing color is switched over with each reversal of the direction of said relative movement.

16. An image printer as defined in claim 15, wherein said exposure control means controls the activation timing of said moving means in synchronism with the timing of the exposure activation of said exposure means.

17. An image printer as defined in claim 15, wherein said exposure control means controls the timing between the activations of said exposure means and said moving means, based on clock signals of a predetermined frequency.

18. An image printer as defined in claim 15, wherein said plurality of color filters are mounted on a rotary member rotatably driven by a drive means, with said color filters being arranged side by side along a periphery of said rotary member.

19. An image printer as defined in claim 15, wherein said plurality of color filters are mounted on a filter mount slidably driven by a drive means, with said color filters being disposed side by side along a sliding direction of said filter mount.

20. An image printer as defined in claim 15, wherein said exposure means is adapted to switch over the exposing colors by selectively positioning said plurality of color filters disposed between a light source and an optical fiber for guiding light from said light source to said photosensitive material.

21. An image printer as defined in claim 20, wherein said light source is disposed outside a casing of the body of the image printer.

22. An image printer comprising:
a projection-exposure section for projecting an image born on a film onto a photosensitive material;
an image-exposure section for exposing the photosensitive material based on image information comprised of a plurality of image areas each including color data relating to a plurality of colors; and
transport means for transporting the photosensitive material through the projection-exposure section and the image-exposure section;
wherein the image-exposure section includes;
exposure means for dividing the image information into a plurality of lines and exposing the photosensitive material with switching exposing colors corresponding to the plurality of color data by switching over a plurality of color filters;
moving means for moving said exposure means and said photosensitive material relative to each other in a direction perpendicular to said lines, and
exposure control means for controlling said moving means and said exposure means in such a manner that a direction of said relative movement between said exposure means and said photosensitive material is reversed when an amount of the relative movement has exceeded a predetermined value corresponding to a predetermined number of the lines and that the exposing color is switched over when the direction of said relative movement is reversed to a direction for the exposure so as to allow said exposure means to effect an exposure only in said direction for the exposure.

23. An image printer as defined in claim 22, wherein said exposure control means controls the activation timing of said moving means in synchronism with the timing of the exposure activation of said exposure means.

24. An image printer as defined in claim 22, wherein said exposure control means controls the timing between the activations of said exposure means and said moving means, based on clock signals of a predetermined frequency.

25. An image printer as defined in claim 22, wherein said plurality of color filters are mounted on a rotary member rotatably driven by a drive means, with said color filters being arranged side by side along a periphery of said rotary member.

26. An image printer as defined in claim 22, wherein said plurality of color filters are mounted on a filter mount slidably driven by a drive means, with said color filters being disposed side by side along a sliding direction of said filter mount.

27. An image printer as defined in claim 22, wherein said exposure means is adapted to switch over the exposing colors by selectively positioning said plurality of color filters disposed between a light source and an optical fiber for guiding light from said light source to said photosensitive material.

28. An image printer as defined in claim 27, wherein said light source is disposed outside a casing of the body of the image printer.

* * * * *